May 20, 1969  W. R. VAN DER VEER  3,444,896
HYDRAULIC INTERVAL TIMER
Filed Jan. 18, 1967
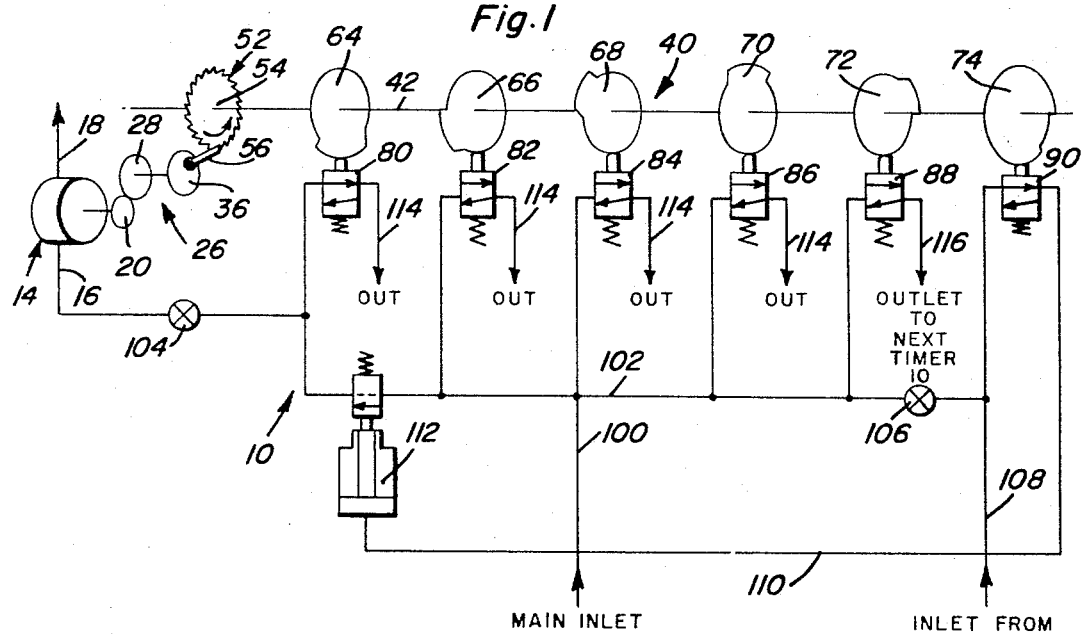
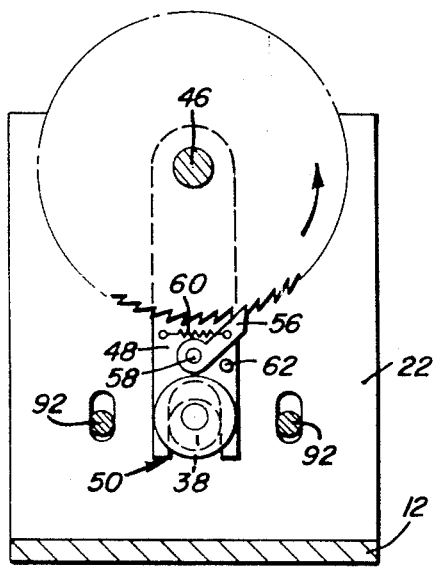
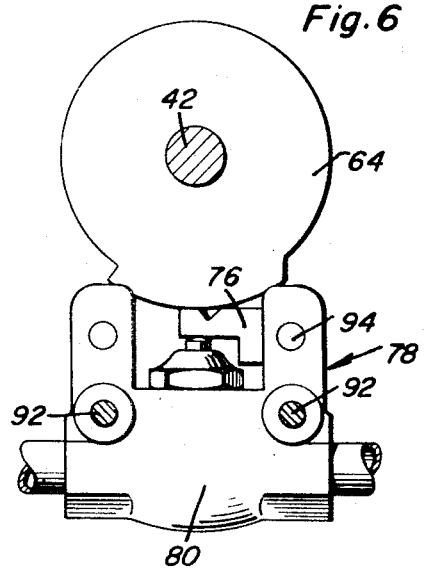
William R. Van der Veer
INVENTOR.

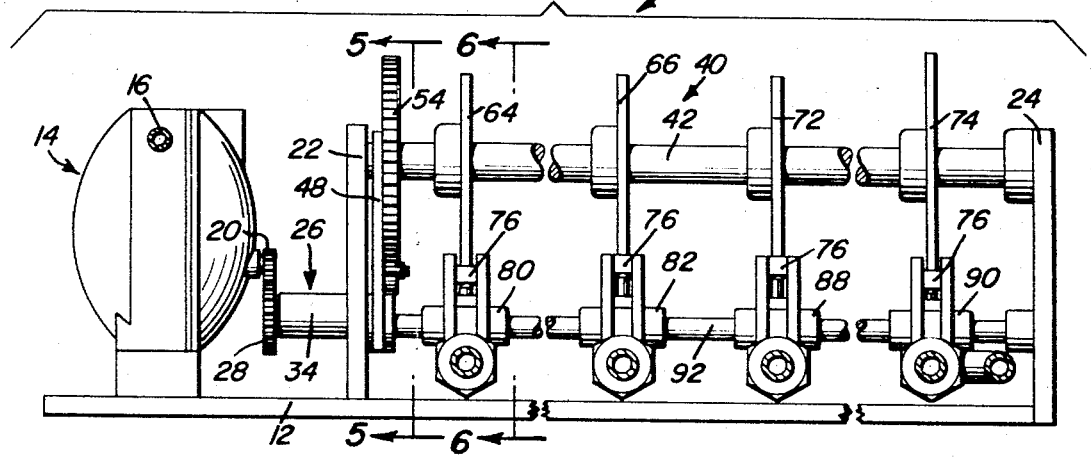
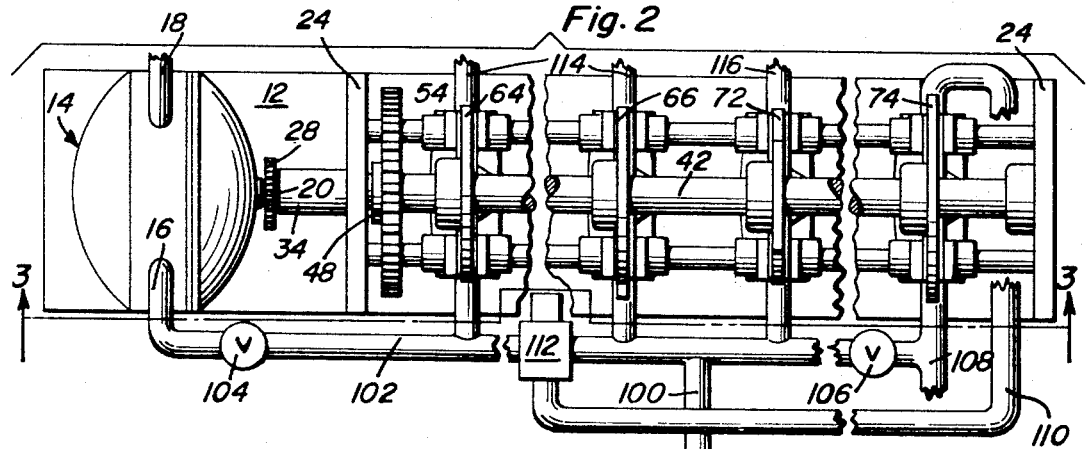
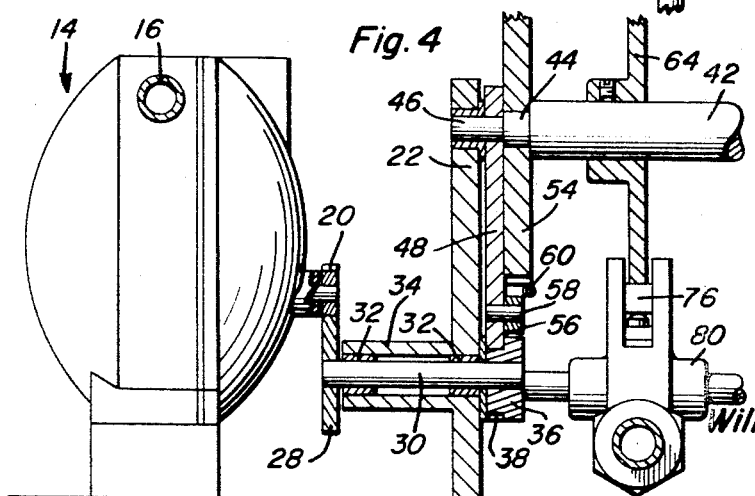
William R. Van der Veer
INVENTOR.

United States Patent Office 3,444,896
Patented May 20, 1969

3,444,896
HYDRAULIC INTERVAL TIMER
William R. Van der Veer, San Antonio, Tex., assignor, by mesne assignments, to William B. Wilson, Iraan, Tex.
Filed Jan. 18, 1967, Ser. No. 610,146
Int. Cl. G05b *19/00;* F15c *3/00;* A01g *25/02*
U.S. Cl. 137—624.2            10 Claims

ABSTRACT OF THE DISCLOSURE

A hydraulically actuated timer including a plurality of pilot valves for sequentially operating a plurality of associated irrigation valves without having to resort to an external source of power other than that derived from the pressure and/or flow of the water being used for irrigation purposes.

---

The present invention relates to a hydraulically actuated hydraulic interval timer and more particularly to a hydraulically actuated timer for the remote control of pressure responsive diaphragm actuated valves. More specifically, the present invention relates to the provision of a novel construction for a hydraulic interval timer adapted to be utilized to sequentially operate diaphragm valves in agricultural irrigation systems and the like.

The prior art contains numerous examples of flow dividing and water distributing valves of the type which service a plurality of water outlets in timed relation to a water inlet as would normally be the case in a lawn sprinkler system or the like wherein it is desired to sequentially operate a plurality of sprinklers singly at full line pressure. However, in commercial agricultural irrigation systems, such as utilized for the irrigation of orchards, row crops and the like, no suitable device has been proposed heretofore which could perform the function of remotely controlling and timing the opening and closing of valves in irrigation hydrants and standpipes without having to resort to some auxiliary source of power, i.e., power other than that derived from the flow or static pressure of the irrigation water, such as compressed air, electricity, standby engines, or the like. Heretofore, the most common solution to the problem has been the use of electrically operated valves and an electrically actuated interval timer. Even then, such a system is not capable of operating large capacity valves directly but has to operate through additional electric operators, such as electric solenoid valves which in turn operate the large capacity water valves. This, of course, requires that electrical power has to be supplied to the operating site.

It will accordingly be appreciated that a need still exists for a hydraulic interval timer adapted to sequentially operate a plurality of irrigation valves without having to resort to an external source of power other than that derived from the pressure and/or flow of the water being used for irrigation purposes.

Another object of the present invention is to provide a hydraulic interval timer of a novel construction adapted to derive all its power from the water supply line used to supply irrigation water to the valves being controlled by the hydraulic interval timer.

Still another object of the present invention is to provide a novel construction for a hydraulic interval timer which is adapted to automatically sequence a group of irrigation valves wherein the valves are operated in series, one at a time, in a manner such that relatively large capacity irrigation water valves comprising a part of an irrigation hydrant, standpipe or the like are opened for a specific length of time to flood a field and then closed after which the next series valves in the system are similarly operated.

Still another object of the present invention is to provide a simple, relatively inexpensive hydraulic interval timer which is adapted to be connected in series with one or more similar units so as to permit sequential operation of the hydraulic interval timer units per se as well as permitting the sequential operation of a plurality of valves controlled by each of the hydraulic interval timers.

Still a further object of the present invention is to provide a hydraulic interval timer constructed in such a manner so as to be adjustable to be self-terminating at the end of a sequencing cycle.

Still another object of the present invention is to provide a novel construction for a hydraulic interval timer wherein variable speed hydraulic motor means is adapted to drive a cam means in a step-by-step fashion so as to operate a plurality of pilot valves associated with the cam means whereby the pilot valves may sequentially operate diaphragm actuated valves comprising outlet valves in the irrigation system so as to insure desired distribution of irrigation water therefrom.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a schematic view of an exemplary embodiment of a hydraulic interval timer module constructed in accordance with the principles of the present invention;

FIGURE 2 is a fragmentary top plan view of a hydraulic interval timer constructed in accordance with the schematic device illustrated in FIGURE 1;

FIGURE 3 is a side elevational view of the hydraulic interval timer of the present invention taken substantially along the plane of the line 3—3 of FIGURE 2;

FIGURE 4 is an enlarged fragmentary view of the hydraulic interval timer of FIGURES 2 and 3 and further showing certain details of the gear means of the hydraulic timer;

FIGURE 5 is an enlarged vertical cross-sectional view taken substantially along the plane of the line 5—5 of FIGURE 3; and FIGURE 6 is a fragmentary cross-sectional view taken substantially along the plane of the line 6—6 of FIGURE 3.

Referring now in detail to the drawings and particularly FIGURES 1 and 2 it will be seen that the exemplary embodiment 10 of a hydraulic interval timer constructed in accordance with the present invention includes a base means 12 which in the embodiment illustrated comprises an elongated rectangular metallic plate. A variable speed hydraulic motor means indicated generally at 14 is secured adjacent one end of the base means 12. The hydraulic motor means 14 includes water inlet and outlet conduits 16 and 18 respectively. The hydraulic motor means 14 is of a conventional type wherein water or the like, under pressure entering through the conduit 16 impinges against a hydraulically driven turbine blade and is exhausted through the outlet conduit 18 while the rotation of the turbine is utilized to impart rotation to the output gear element 20. It will thus be appreciated that the hydraulic motor means 14 comprises a conventional hydraulic motor. A pair of upstanding end bearing plates 22 and 24 provide a means of mounting a reduction gear means indicated generally at 26 in meshing engagement with the hydraulic motor output gear 20. Toward this end, it will be seen that the reduction gear means 26 includes gear 28 fixed to a shaft 30 rotatably journaled in bearings 32 press fit into the hub 34 integral with and projecting laterally from the end plate 22. The shaft 30 opposite the end provided with the gear 28 has secured thereto a rotary crank member 36 provided with an eccentric cam surface 38 as best seen in FIGURES 4 and 5.

The end plates 22 and 24 also rotatably support a cam means indicated generally at 40 which includes a camshaft 42 having its end portions rotatably journaled in suitable bearings provided in the end plates 22 and 24. As seen best in FIGURE 4, the end of the shaft 42 adjacent the end plate 22 is provided with two stepped diameters indicated at 44 and 46 of lesser diameter than the shaft 42. Mounted for swinging movement, in a pendulum fashion, from the reduced diameter 46 of the shaft 42 is a crank follower 48 having an aperture adjacent the upper end thereof sized so as to permit loose fit of the crank follower 48 on the portion 46 of the shaft 42. The crank follower 48 is provided with a bifurcation adjacent its lower end which bifurcation indicated generally at 50 engages the eccentric cam 38 of the rotary crank 36. It will therefore be appreciated that constant rotary motion of the rotary crank 36 will impart an oscillation to the crank follower 48 as it moves back and forth about the axis of the shaft 42 under the influence of the eccentric cam 38. The crank follower 48 in fact comprises a portion of a ratchet means 52 which also includes a ratchet wheel 54 which is engaged in a unidirectional step-by-step manner by a spring-biased pawl 56 pivotally secured as at 58 to the crank follower 48 and normally biased into contact with the ratchet wheel 54 by a helical spring 60 having one end secured to the crank follower 48 and the other end secured to the pawl 56. In addition, a stop pin 62 is also preferably provided on the crank follower 48 to limit travel of the pawl 56 as it is indexed counterclockwise, as seen in FIGURE 5, by the oscillation of the crank follower 48. Thus, it will be appreciated that a step-by-step unidirectional rotational movement of the shaft 42 is effected by the hydraulic motor means 14 in such a manner that the timer 10 will operate satisfactorily at pressures as low as about 5 p.s.i. The camshaft 42 carries a plurality of adjustable pilot valve cam actuators 64, 66, 68, 70, 72 and 74 locked thereto by setscrews, not shown, and having cam surfaces comprising either outwardly or inwardly projecting portions which normally extend approximately 75° to 80° about the periphery thereof for reasons which will become apparent hereinafter during a discussion of the operation of the hydraulic interval timer 10.

As seen schematically in FIGURE 1 and in plan, in FIGURE 3, and further detailed in FIGURE 6, the pilot valve actuator cams 64–74 engage cam followers 76 which comprise an element of a plurality of pilot valve assemblies indicated generally at 78 and specifically comprising pilot valves 80, 82, 84, 86, 88 and 90. The pilot valves 80–90 are rigidly mounted with respect to the base means 12 by virtue of tie rods 92 which pass through appropriate bores in the bodies of the valves and are secured in the end plates 22 and 24. The cam followers 76 of each of the respective pilot valves 80–90 are secured for pivotal movement about the pins 94 received in bifurcations comprising an integral part of the bodies of the respective pilot valves. From a consideration of FIGURE 1 it will be appreciated, and as schematically shown therein, that the pilot valves 80–90 comprise reciprocating plunger type valves which are normally spring-biased closed. The pilot valves are opened by the cam actuators 64–74 in a sequential manner to be described hereinafter.

From a simultaneous consideration of FIGURES 1 and 2 it will be seen that the hydraulic interval timer 10 further includes inlet piping means comprising a main water inlet 100 in communication with pilot valve inlet manifold 102 which connects the main inlet 100 with the inlet side of the pilot valves 80–90. The inlet mainfold 102 connects with the motor inlet conduit 16 by an interconnecting valve 104 which comprises a means of regulating thte speed of the hydraulic motor means 14 by throttling of the water being supplied thereto. The inlet manifold 102 is further provided with a valve 106 to permit controlling the flow between the manifold 102 and an inlet conduit 108 which comprises an inlet from a previous timer in a series of timers. The pilot valve 90 is further provided with an outlet conduit 110 which is connected to a hydraulically actuated valve 112 interposed in the inlet manifold 102 as seen best in FIGURES 1 and 2. The valve 112 is normally spring-biased in an off position and is adapted to permit flow therethrough in response to suitable pressurization of the conduit 110 in a manner to be described with regard to the operation of the hydraulic interval timer 10. The pilot valves 80, 82, 84 and 86 are provided with pilot valve outlet conduits 114 so as to sequentially supply water under line pressure to be directed to pressure responsive hydraulically actuated valves comprising a portion of a hydraulically controlled irrigation system or the like. The pilot valve 88 is provided with an outlet conduit 116 preferably adapted to be utilized to connect a plurality of hydraulic interval timers 10 in series or parallel flow relationship.

The operation of the hydraulic interval timer 10 is as follows. The cam means 40 is rotated to a starting position, such as that shown in FIGURE 1, wherein the valve actuator cams 64 and 74 open the pilot valves 80 and 90, respectively. The pilot valves 82, 84, 86 and 88 as well as the main inlet valve 112 are closed. Assuming that the hydraulic interval timer 10 as shown in FIGURE 1 is the first one in a sequence of timers, the inlet conduit 108, adapted to be normally connected to the outlet from a previous timer, is capped by a suitable means and the bypass valve 106 is opened. The motor speed regulating valve 104 is at least partially opened and the main inlet conduit 100 is connected to the primary hydraulic supply, such as by virtue of a branch line from an irrigation system water supply outlet or conduit. As soon as there is pressure on the primary hydraulic supply there is fluid flow through the bypass valve 106 as well as through the pilot valve 90 and thence through the conduit 110 into the main valve 112 causing the main valve 112 to open and admit fluid flow through pilot valve 80 and of course outwardly through the conduit 114 to the pressure responsive hydraulically actuated irrigation valve or other device associated therewith. Simultaneously, fluid also passes through the motor speed regulating valve 104 to the hydraulic motor means 14 causing rotation of the reduction gear means 26 and ratchet means 52 associated therewith so as to impart rotation to the cam means 40, to index the actuator cams 64–74 to sequentially open the pilot valves 82, 84, 86 and 88 and for reasons which will become clear close the pilot valve 90 which is normally maintained opened for approximately 300° of the rotational travel of the cam 74. The speed of rotation of the camshaft 42 may be regulated by suitably adjusting the motor speed regulating valve 104 which of course effects the speed of the hydraulic motor means 14. Thus the timing interval during which pilot valve 80 supplies pressure and/or flow through its outlet conduit 114 to its associated device may be varied. As the cam 64 which operates valve 80 reaches the end of its cycle the cam follower of the valve 80 moves upwardly under the bias of its associated spring to close the valve 80, the second cam in the series, namely 66, actuates pilot valve 82 by depressing the cam follower downwardly against the bias of its associated spring so as to establish flow through the valve 82. As will be appreciated from a further consideration of FIGURE 1 pilot valve 90 is maintained open during the successive actuation of the pilot valves 80, 82, 84 and 86. It will further be appreciated that insmuch as the cam members 64–74 are adjustably secured on the camshaft 42 such as by means of the setscrews that a plurality of the pilot valves 80–86 may be opened at one time rather than sequentially as shown.

As the timed interval for valve 86 terminates and the valve 86 closes, valve 88 is opened and supplies flow and/or pressure to the next hydraulic interval timer 10 in the sequence through its associated outlet conduit 116. It will be noted that the hydraulic motor means 14 and the cam means 40 are still operating and that valve 90 is still open. As soon as valve 88 is fully opened and the following hydraulic interval timer module 10 in the sequence actuated, the actuating cam 74 for valve 90 closes the valve 90 by permitting the follower of the valve 90 to move upwardly under the bias of its associated spring so as to move the follower into the depression in the periphery of the cam 74 which results in a loss of pressure in the main inlet valve 112. The main inlet valve closes under the influence of its associated spring thereby shutting off fluid flow to the hydraulic motor means 14 thus preventing the hydraulic interval timer 10 from recycling. It should also be noted that valve 88 remains in an opened condition when the hydraulic motor means 14 shuts down thereby insuring that the pressure continues to be applied to the next hydraulic interval timer 10 in the sequence. A succeeding hydraulic interval timer 10 in the series of timers has been placed in a starting condition as previously described with regard to the timer of FIGURE 1 with the exception that the bypass valve 106 is closed. Therefore, fluid flow entering the succeeding hydraulic interval timer 10 through the inlet conduit 108 initiates cycling of that respective hydraulic interval timer 10. In this manner a large number of timers can be made to function either in series or in parallel.

It will therefore be appreciated that hydraulic interval timers constructed in accordance with the principles of the present invention may be advantageously utilized to sequentially actuate a plurality of pressure responsive valves in a fluid flow system, such as an irrigation system by the utilization of power derived from the flow of the fluid in the system without having to resort to the use of any other external source of power.

What is claimed as new is as follows:

1. A hydraulically actuated hydraulic interval timer adapted to automatically sequence a plurality of pressure responsive agricultural irrigation valves and the like from the main supply water to the irrigation valves which timer comprises in combination a base means, hydraulic motor means including output drive means secured to said base, gear train means operatively associated with and driven by said output drive means of said hydraulic motor, cam means carried by said base means and rotatably journaled in relation to said base means, said cam means being driven by said gear train means, a plurality of spring-biased normally closed pilot valve means, said cam means being adapted to operate said pilot valve means, fluid flow conduit means connecting together said pilot valve means and said hydraulic motor means, whereby fluid under pressure supplied to said fluid flow conduit means actuates said hydraulic motor means while simultaneously rotating said cam means to sequentially permit fluid flow from said fluid flow conduit through said pilot valve means to actuate an irrigation system outlet valve and the like operatively associated with said pilot valve means.

2. The combination of claim 1 wherein said hydraulic motor means includes a motor speed varying means.

3. The combination of claim 1 wherein said gear train means includes a ratchet drive means including a ratchet wheel and a ratchet wheel stepping pawl.

4. The combination of claim 1 wherein said cam means includes a plurality of disc-like rotary cam elements having peripheral cam surfaces.

5. A hydraulically actuated interval timer which comprises in combination a base means, hydraulic motor means including output drive means secured to said base, gear train means operatively associated with and driven by said output drive means of said hydraulic motor, cam means including a plurality of rotary cam elements carried by said base means and rotatably journaled in relation to said base means, said cam means being driven by said gear train means, a plurality of spring-biased normally closed pilot valve means, each of said cam elements being adapted to operate a pilot valve means, said pilot valves having at least inlet and outlet ports, valved pilot valve inlet conduit means connecting together the inlets of said pilot valves with said hydraulic motor means and a main fluid inlet conduit, inlet conduit means to at least one of said pilot valves which is adapted to be connected to the discharge of a previous hydraulic timer in a series of such timers, valved bypass conduit means interconnecting said conduit adapted to be connected to a previous timer and said valved pilot valve inlet conduit means, the outlet of said pilot valve provided with an inlet conduit adapted to be connected to a previous timer being connected by a conduit means to a main normally closed pressure responsive valve means interposed in flow controlling relation in said pilot valve inlet conduit between said main inlet conduit and said hydraulic motor means whereby cycling of said hydraulically actuated interval timer may be initiated from a previous hydraulic timer in a series of hydraulic timers, and all but one of said pilot valve outlets being operatively connected to a hydraulically actuated device.

6. The combination of claim 5 including hydraulic motor speed varying means interposed in said pilot valve inlet conduit upstream of said motor means.

7. The combination of claim 6 wherein said motor speed varying means comprises a throttling valve means.

8. The combination of claim 5 wherein said gear train means includes a ratchet drive means including a ratchet wheel and a ratchet wheel stepping pawl.

9. The combination of claim 1 wherein said hydraulic motor means is adapted to operate at a main fluid inlet conduit pressure as low as approximately 5 p.s.i.

10. The combination of claim 4 wherein said cam elements are provided with dissimilar peripheral cam surfaces adapted to actuate their associated pilot valve means for unequal timed intervals.

References Cited

UNITED STATES PATENTS

| 1,820,252 | 8/1931 | Shippy | 137—624.2 |
| 2,320,011 | 5/1943 | Reynolds | 137—627 XR |
| 2,824,569 | 2/1958 | Wright | 137—627 XR |
| 2,906,332 | 9/1959 | Rosten et al. | 137—624.2 |
| 3,136,335 | 6/1964 | Beech et al. | 137—624.14 XR |
| 3,345,915 | 10/1967 | Dotto | 251—230 XR |
| 3,372,708 | 3/1968 | Hotchkin | 137—624.2 |

FOREIGN PATENTS 311,357  11/1955  Switzerland.

DONALD E. WATKINS, *Primary Examiner.*

U.S. Cl. X.R.

251—230